(12) United States Patent
Bradford (10) Patent No.: US 9,073,527 B2
(45) Date of Patent: Jul. 7, 2015

(54) SMOOTH BORE DYNAMIC CENTER SEAL FOR SPRING BRAKE ACTUATOR

(75) Inventor: Aaron C. Bradford, Olathe, KS (US)

(73) Assignee: HALDEX BRAKE CORPORATION, Kansas City, MO (US)

( * ) Notice: Subject to any disclaimer, the term of this patent is extended or adjusted under 35 U.S.C. 154(b) by 335 days.

(21) Appl. No.: 13/077,484

(22) Filed: Mar. 31, 2011

(65) Prior Publication Data

US 2012/0247880 A1 Oct. 4, 2012

(51) Int. Cl.
*B60T 17/08* (2006.01)

(52) U.S. Cl.
CPC ............. *B60T 17/088* (2013.01); *B60T 17/083* (2013.01)

(58) Field of Classification Search
CPC ..... B60T 17/08; B60T 17/083; B60T 17/085; B60T 17/086; B60T 17/088
USPC ............ 188/151 R, 153 D, 170, 322.17, 357; 92/62, 63, 168, 130 A, 64; 277/346, 277/436, 437, 500, 510, 511, 516; 91/378
See application file for complete search history.

(56) References Cited

U.S. PATENT DOCUMENTS

| | | | |
|---|---|---|---|
| 2,212,500 A * | 8/1940 | Huhn ........................... 277/516 |
| 2,978,871 A * | 4/1961 | Rockwell ........................ 60/550 |
| 3,613,515 A * | 10/1971 | Swander et al. .................. 92/63 |
| 3,712,181 A * | 1/1973 | Swander et al. .................. 92/63 |
| 3,813,994 A | 6/1974 | Swander, Jr. et al. |
| 3,977,308 A | 8/1976 | Swander, Jr. et al. |
| 4,476,772 A * | 10/1984 | Gorman et al. .................. 92/168 |
| 4,664,362 A * | 5/1987 | Hennells ........................ 267/119 |
| 4,893,823 A * | 1/1990 | Strouse et al. ................. 277/437 |
| 5,377,579 A | 1/1995 | Pierce |
| 5,616,017 A * | 4/1997 | Iizuka et al. ..................... 418/63 |
| 5,782,162 A * | 7/1998 | Lanteigne et al. .............. 92/168 |
| 6,003,433 A * | 12/1999 | Pierce et al. ................... 92/98 R |
| 6,006,651 A | 12/1999 | Pierce et al. |
| 6,394,462 B1 * | 5/2002 | Constantinides et al. ..... 277/502 |
| 6,588,314 B1 * | 7/2003 | Stojic ................................. 92/63 |
| 6,820,729 B2 * | 11/2004 | Verriet ...................... 188/322.17 |
| 2002/0005615 A1 * | 1/2002 | Turiansky ...................... 277/437 |
| 2006/0131116 A1 * | 6/2006 | Plantan et al. ............. 188/153 D |
| 2006/0249913 A1 | 11/2006 | Nessa |
| 2007/0013229 A1 | 1/2007 | Plantan et al. |
| 2007/0034465 A1 | 2/2007 | Thompson et al. |

(Continued)

FOREIGN PATENT DOCUMENTS

| | | | | |
|---|---|---|---|---|
| CH | 667141 A * | 9/1988 | ............... F16J 15/56 |
| CN | 1175230 A | 3/1998 |

(Continued)

OTHER PUBLICATIONS

European Search Report Application No. EP 12 16 2449 Completed: Jul. 25, 2012; Mailing Date: Aug. 7, 2012 6 pages.

*Primary Examiner* — Bradley King
*Assistant Examiner* — Stephen Bowes
(74) *Attorney, Agent, or Firm* — St. Onge Steward Johnston & Reens LLC (57) ABSTRACT

A sealing assembly and method of manufacturing a sealing assembly for a spring brake actuator having a dynamic center seal for sealing a first surface to a second surface. The sealing assembly has dynamic sealing elements that seal in a smooth hole or bore, where the sealing element or element stack is retained in the hole or bore on each end by a bearing for the center pushrod or center tube.

22 Claims, 6 Drawing Sheets

(56) References Cited

U.S. PATENT DOCUMENTS

| | | |
|---|---|---|
| 2007/0131498 A1 | 6/2007 | Li et al. |
| 2008/0083325 A1 | 4/2008 | Scheckelhoff et al. |
| 2010/0095836 A1* | 4/2010 | Fisher et al. .................. 92/63 |

FOREIGN PATENT DOCUMENTS

| | | | | |
|---|---|---|---|---|
| CN | 101725652 A | | 6/2010 | |
| DE | 3101608 A1 | * | 8/1982 | .............. F16D 65/32 |
| DE | 3115918 A1 | * | 11/1982 | .............. F16D 65/32 |
| EP | 0542568 A2 | | 5/1993 | |
| GB | 1140009 A | | 1/1969 | |
| GB | 1249530 A | | 10/1971 | |
| GB | 2288438 A | | 10/1995 | |
| JP | S491892 B1 | | 1/1974 | |
| JP | S61197380 U | * | 12/1986 | .............. F16L 19/03 |
| WO | WO 9421501 A1 | * | 9/1994 | .............. B60T 17/08 |

\* cited by examiner

SMOOTH BORE DYNAMIC CENTER SEAL FOR SPRING BRAKE ACTUATOR

FIELD OF THE INVENTION

This invention relates to a sealing assembly for a spring brake actuator having a dynamic center seal for sealing a first surface to a second surface.

BACKGROUND OF THE INVENTION

Air brake systems for a vehicle such as a bus, truck, trailer and other heavy-duty vehicles or the like typically include a brake shoe and drum assembly which is actuated by means of an actuator assembly operated by the selective application of compressed air. Conventional air brake actuators have both a service brake actuator for actuating the brakes under normal driving conditions by the application of compressed air and also a spring-type emergency brake actuator which causes actuation of the brakes when air pressure has been released. The emergency brake actuator includes a strong compression spring which forces application of the brake when air is released. This is often referred to as the spring brake.

When applying the parking brakes, the spring brake actuator pressure is discharged from the pressure chamber and the large force compression spring pushes the spring piston and the diaphragm toward the dividing wall between the spring brake actuator and the service brake actuator. In this position, the actuator rod connected to the spring piston is pushed forward extending into the service section through the dividing center wall applying the parking or emergency brakes and thus forcing the vehicle to stop or remain parked. To release the parking brake, the pressure chamber is closed to the atmosphere and pressurized air is introduced into the pressure chamber of the spring brake actuator which expands the pressure chamber, moving the diaphragm and spring piston toward the opposing end of the spring brake actuator housing, thereby compressing the strong compression spring.

U.S. Pat. No. 6,006,651 (Pierce et al.) teaches a spring brake having an actuator with an opening provided with a bearing having at least one annular recess which accommodates at least one O-ring seal. U.S. Pat. No. 5,377,579 (Pierce) teaches a spring brake having an actuator with one or more O-ring seals through which the spring brake actuator rod reciprocates.

U.S. Pat. No. 3,977,308 (Swander, Jr. et al.) teaches a brake actuator having an opening where a retainer ring is positioned which retains a nylon and small seal or O-ring positioned in said opening. U.S. Pat. No. 3,813,994 (Swander, Jr. et al.) teaches a spring brake actuator having a seal and guide bushing retained by a ring. United States Patent Application No. 2008/0083325 A1 (Scheckelhoff et al.) teaches a spring brake actuator having bearings and seals for fluid reciprocation of the connecting shaft within the aperture. United States Patent Application No. 2007/0034465 A1 (Thompson et al.) teaches a flexible bushing assembly for a spring brake push rod seal having a sealing member to engage the push rod. Thompson et al. also teach a threaded section. United States Patent Application No. 2007/0131498 A1 Li et al. teaches a sealing member of one or more O-ring seals positioned around a push rod.

However, none of the above mentioned patents teaches a spring brake center seal design which involves dynamic sealing elements that seal in a smooth hole, bore or cavity, where the sealing element or element stack is retained in the hole, bore or cavity on each end by a bearing for the center pushrod or center tube.

Furthermore, none of the above mentioned patents teach a spring brake center seal design which has a sealing element separator between two sealing elements, such that less complicated machining is required to achieve a proper surface finish for sealing with the smooth hole or bore or cavity design since it is a through hole rather than in a groove.

As none of the prior art teaches such a design, it is desirable to provide such a sealing assembly and method for making such a sealing assembly.

It is further desirable to provide a spring brake center seal design which involves dynamic sealing elements that seal in a smooth hole or bore, where the sealing element or element stack is retained in the hole or bore on each end by a bearing for the center pushrod or center tube.

It is further desirable to provide a spring brake center seal design which has a sealing element separator between two sealing elements, such that less complicated machining is required to achieve a proper surface finish for sealing with the smooth hole or bore design since it is a through hole rather than in a groove.

SUMMARY OF THE INVENTION

Accordingly, it is an object of the present invention to provide a sealing assembly and method for making such a sealing assembly that has a dynamic center seal for sealing a first surface to a second surface.

It is another object of the present invention to provide a sealing assembly and method for making such a sealing assembly that overcomes the problems of the prior art.

It is another object of the present invention to provide a spring brake center seal design which involves dynamic sealing elements that seal in a smooth hole or bore, where the sealing element or element stack is retained in the hole or bore on each end by a bearing for the center pushrod or center tube. A bore, hole or cavity may be used interchangeably throughout the application.

It is another object of the present invention to provide a spring brake center seal design which has a sealing element separator between two sealing elements, such that less complicated machining is required to achieve a proper surface finish for sealing with the smooth hole or bore design since it is a through hole rather than in a groove.

It is another object of the present invention to provide a spring brake actuator having such a sealing assembly.

It is another object of the present invention to provide a sealing assembly having a hole located between a first sealing surface and second sealing surface and also having two sealing elements located within the hole and one sealing element separator located within the hole and between the two sealing elements.

These and other objectives are achieved by providing an assembly for forming a seal in a spring brake actuator comprising: a first component having a first surface, a second component having a second surface, a cavity, the cavity located between the first surface and the second surface, one or more sealing elements located within the cavity, and one or more retaining elements located within the cavity, the one or more retaining elements retaining the one or more sealing elements within the cavity, and the one or more sealing elements providing a seal, so as to seal the first surface to the second surface.

The diameter of the one or more sealing elements may be greater than the distance between the first and second sealing surfaces.

The assembly may further comprise one or more sealing element separators.

The one or more sealing element separators may separate the one or more sealing elements from one another. The combined width of the one or more sealing element separators, the one or more sealing elements and the one or more retaining elements may be greater than the width of the cavity.

The cavity may be circular and may have an equal diameter throughout. The one or more retaining elements may be located along the ends of the cavity.

The one or more sealing element separators may be free floating or retained in the cavity. The cavity may be smooth. The first surface of the component may also be smooth. The second surface may also be smooth.

The one or more sealing elements may be selected from a group consisting of a square-ring, O-ring, quad-ring, lip seal, or a combination thereof. The one or more retaining elements may be bearings.

The seal formed may be dynamic. The cavity may be a through hole and may be made by a drill, mill, lathe, or other similar machine.

The first component may be a pushrod. The second component may be a center body.

Other objectives of the invention are achieved by providing a spring brake actuator for applying parking brakes of a vehicle comprising: a housing including a first end wall, a second end wall opposing the first end wall, and a side wall extending between the first and second end walls, the first end wall, the second end wall and the side walls together defining an cavity therein; a diaphragm spanning the cavity, and dividing the cavity into a spring chamber located between the diaphragm and the first end wall, and a pressure chamber located between the diaphragm and the second end wall, the diaphragm being in a first position when the pressure chamber is pressurized with fluid and in a second position when the pressure chamber is exhausted; a pushrod, wherein when the diaphragm is in the second position the pushrod is positioned to apply the parking brake, and when the diaphragm is in the first position the pushrod is positioned to release the parking brake; and an assembly for sealing the pushrod to a center body, the assembly comprising: a first surface located on the center body, a second surface located on the pushrod, a cavity, the cavity located between the first surface and the second surface, one or more sealing elements located within the cavity, one or more retaining elements located within the cavity, the one or more retaining elements retaining the one or more sealing elements within the cavity, and the one or more sealing elements providing a seal, so as to seal the first surface to the second surface, wherein upon sealing the first surface to the second surface the pushrod is sealed to the center body.

The diameter of the one or more sealing elements may be greater than the distance between the first surface and the second surface.

The assembly of the spring brake actuator may further comprise one or more sealing element separators and the one or more sealing element separators may separate the one or more sealing elements from one another.

The combined width of the one or more sealing element separators, the one or more sealing elements and the one or more retaining elements may be greater than the width of the cavity.

The cavity may be circular and has an equal diameter throughout. The one or more sealing element separators may be free floating or retained in the cavity.

Other objectives of the invention are achieved by providing an assembly for sealing a spring brake actuator comprising: a first component having a first surface, a second component having a second surface, a cavity, the cavity located between the first surface and the second surface, two sealing elements located within the cavity, one sealing element separator located within the cavity and between the two sealing elements, and two retaining elements located within the cavity, the two retaining elements retaining the two sealing elements within the cavity, and the two elements providing a dynamic seal, so as to seal the first surface to the second surface.

The combined width of the two sealing elements and sealing element separator may be greater than the distance between the two retaining elements.

The diameter of each of the two sealing elements may be greater than the distance between the first surface and the second surface.

The cavity may be circular and has an equal diameter throughout. The cavity may be made by a drill, mill, lathe, or other similar machine.

The one sealing element separator may be free floating or retained in the cavity.

Other objectives of the present invention are achieved by providing a spring brake center seal design which involves dynamic sealing element(s) that seal in a smooth hole or a smooth bore, being a hole made by a drill, mill, lathe, or other similar machine. The smooth hole is a through hole with an equal diameter throughout. The sealing element or element stack is retained in the hole on each end by a bearing for the center pushrod or center tube. If a sealing element stack is used, the sealing element separator(s) may be either free floating or retained in the hole. Inside the hole, the only necessary machined features would be those used for retaining the bearings and/or sealing element separator(s). The sealing element(s) may be any commercially available seal (such as a square-ring, O-ring, quad-ring, lip seal) in any quantity and/or combination thereof.

The use of a smooth hole in place of machined gland groove(s) reduces the amount of material removed during machining and the amount of time required for machining. If the parent material is cast, this design has the added benefit of reducing the chance of machining into porosity since less parent material is removed and a thinner wall section is initially cast. Machining into porosity has the result of an ineffective seal and a scrapped part.

Less complicated machining is required to achieve a proper surface finish for sealing is with the smooth hole or bore design since it is a through hole rather than a groove. Measuring the surface finish of a through hole is also less complicated than in a groove.

The smooth hole or bore design allows for easier installation of sealing elements. Since the bore diameter is close to the outer diameter of the sealing element, there is less chance of rolling or twisting the sealing element during assembly which could lead to premature failure of the seal.

The invention also relates to methods of making such a sealing assembly. The invention relates to a method of manufacturing said sealing assembly. The method of manufacturing such sealing assembly involves the steps of manufacturing the individual elements of the sealing assembly.

The invention also relates to methods for installation and/or assembly such a sealing assembly involving the steps for putting the elements of such sealing assembly together in the proper arrangement.

Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention

DETAILED DESCRIPTION OF THE INVENTION

Figure 1:
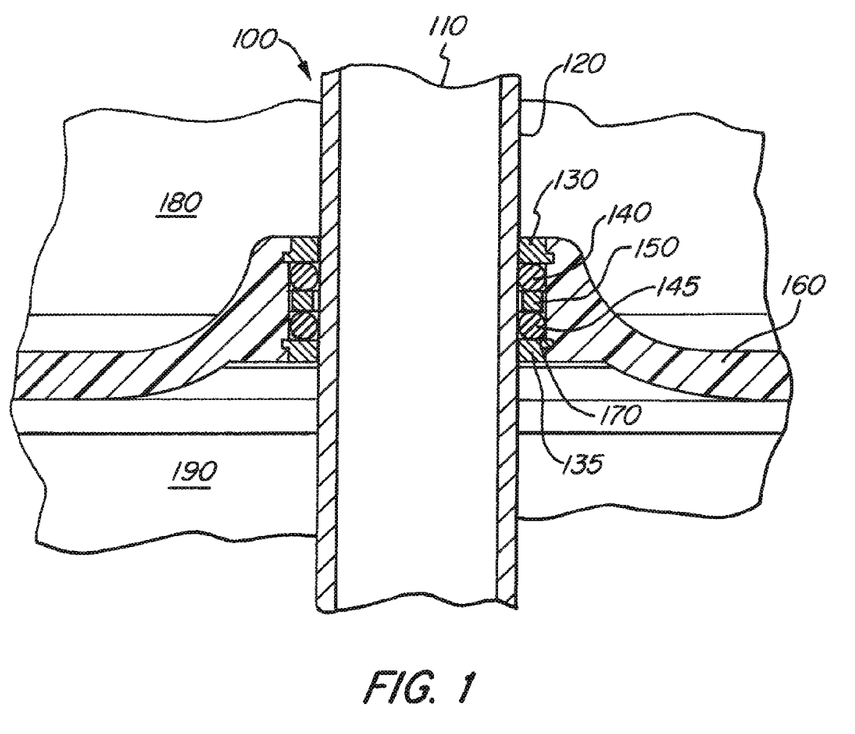
FIG. 1 is a cross-section view of the sealing assembly of an embodiment of the present invention.

Referring to FIG. 1, sealing assembly 100 of the present invention is shown. Here, actuator pushrod 110 is shown having a dynamic sealing surface 120. The actuator pushrod 110 runs through center body 160, which separates the spring side 180 from the service side 190 of the spring brake actuator.

FIG. 1 also provides the sealing assembly 100 of the present invention whereby the sealing elements 140, 145 are shown. Here, retainer bearings 130 and 135 are shown having sealing elements 140 and 145 present between retainer bearings 130 and 135. Sealing element separator 150 is present between sealing elements 140 and 145.

Also shown in smooth bore sealing surface 170 of the center body 160. The bore or hole is filled by retainer bearings 130 and 135, sealing elements 140 and 145, and sealing element separator 150. These elements allow for the dynamic center seal of the spring brake actuator to be provided. The dynamic center seal allows for sealing a first surface to a second surface. The dynamic center seal assembly allows the pressure within the chamber to be retained or released depending upon the application. This overcomes the problems in the prior art that have failed to achieve such a dynamic sealing assembly that provides advantages with regards to the dynamic sealing of a spring brake actuator.

Figure 2:
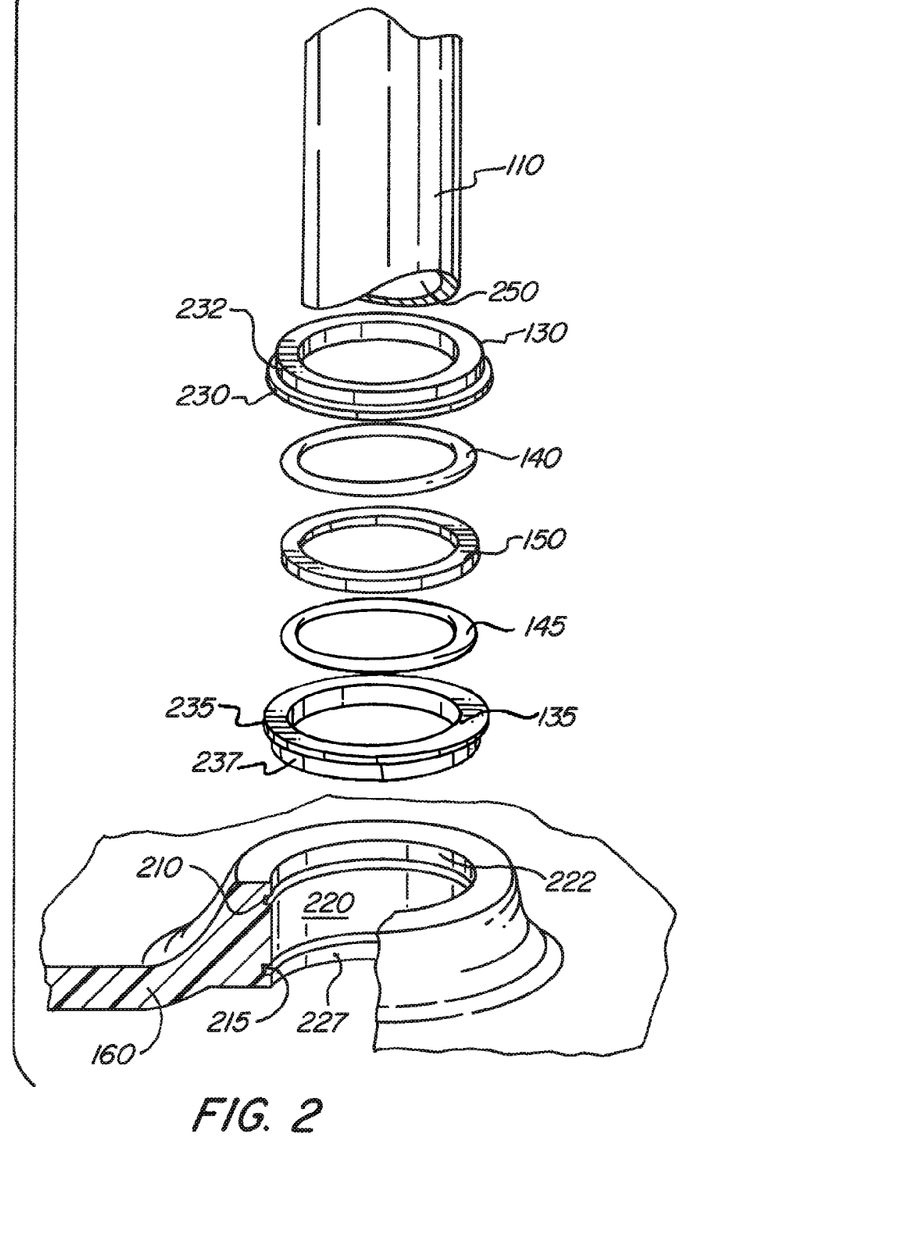
FIG. 2 is an exploded view of the sealing assembly of claim 1.

FIG. 2 shows and exploded view of the sealing assembly of FIG. 1. Here, the sealing assembly is shown having pushrod 110, retainer bearings 130 and 135, sealing elements 140 and 145 present between retainer bearings 130 and 135, and sealing element separator 150 present between sealing elements 140 and 145.

The retainer bearings 130 and 135 have edges 230 and 235 respectively. These edges 230 and 235 fit into holes 210 and 215 respectively, allowing for the retainer bearings 130 and 135 to be retained in the bore 250. However, the retainer bearings may be of a different design that allows the retainer bearings 130, 135 to be retained in the bore 250.

The retainer bearings 130 and 135 also have edges 232 and 237 respectively, which line up with the bore sealing surface 222 and 227 respectively. The bore sealing surface 222 and 227 is smooth in preferred embodiments.

The smooth surface of bore 220 interacts with sealing elements 140 and 145 to form a seal.

The sealing elements may be any commercially available seal such as an O-ring, square ring, quad-ring, and/or lip seal in any quantity and/or combination thereof. Other such sealing elements known in the art may also be used.

The use of a smooth bore in place of machined gland groove(s) reduces the amount of material removed during machining and the amount of time required for machining. If the parent material is cast, this design has the added benefit of reducing the chance of machining into porosity since less parent material is removed and a thinner wall section is initially cast. Machining into porosity has the result of an ineffective seal and a scrapped part.

Less complicated machining is required to achieve a proper surface finish for sealing with the smooth hole or bore design since it is a through hole rather than a groove. Measuring the surface finish of a through hole is also less complicated than in a groove.

The smooth hole or bore design allows for easier installation of sealing elements. Since the bore diameter is close to the outer diameter of the sealing element, there is less chance of rolling or twisting the sealing element during assembly which could lead to premature failure of the seal.

Figure 3:
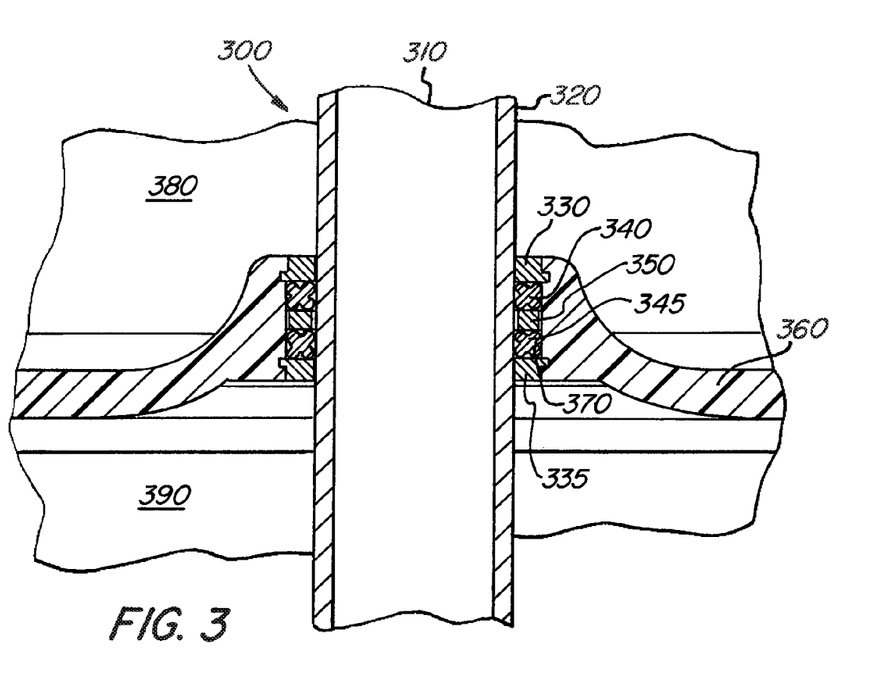
FIG. 3 is a cross-section view of the sealing assembly of an embodiment of the present invention utilizing quad-rings.

Other embodiments are referred to in FIG. 3, where, sealing assembly 300 of the present invention is shown. Here, actuator pushrod 310 is shown having a dynamic sealing surface 320. The actuator pushrod 310 runs through center body 360, which separates the spring side 380 from the service side 390 of the spring brake actuator.

FIG. 3 also provides the sealing assembly 300 of the present invention whereby the sealing elements 340, 345 are shown. Here, retainer bearings 330 and 335 are shown having sealing elements 340 and 345 present between retainer bearings 330 and 335. Sealing element separator 350 is present between sealing elements 340 and 345. Sealing elements 340 and 345 are provided and shown as a quad-ring.

Also shown is smooth bore sealing surface 370 of the center body 360. The bore or hole is filled by retainer bearings 330 and 335, sealing elements 340 and 345, and sealing element separator 350. These elements allow for the dynamic center seal of the spring brake actuator to be provided.

Figure 4:
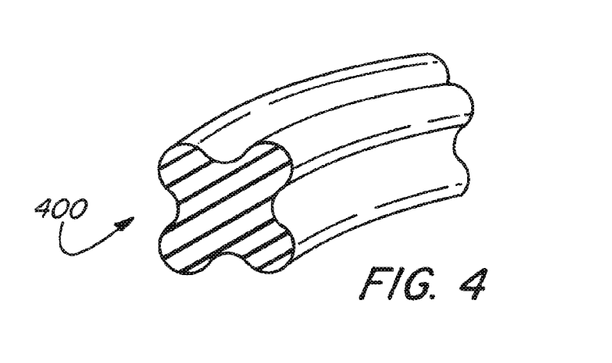
FIG. 4 is a perspective view of a quad-ring.

FIG. 4 show a perspective view of a quad ring 400 that is used as sealing elements 340 and 345.

Figure 5:
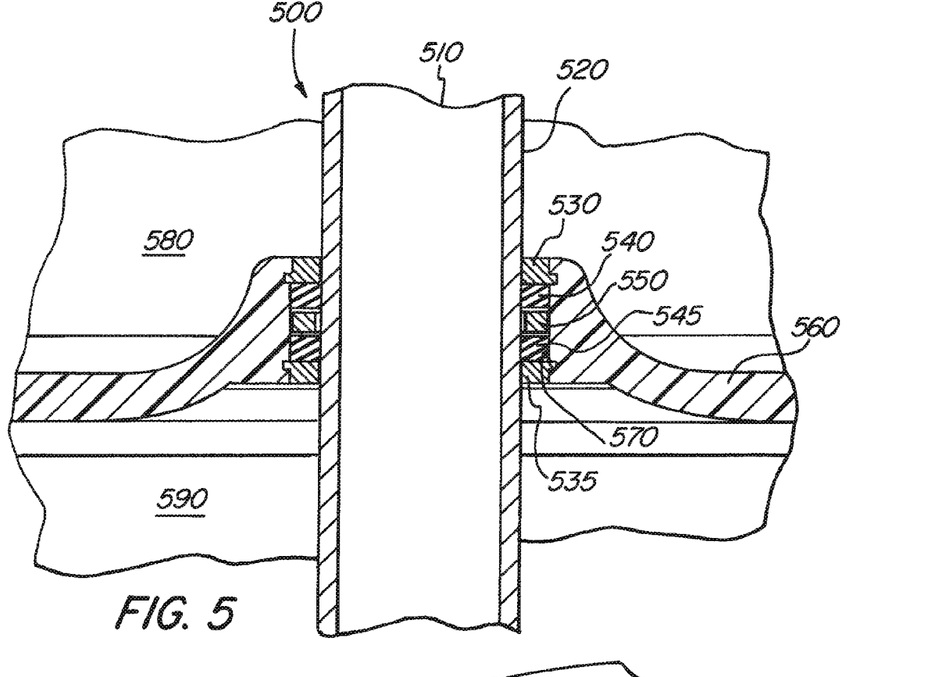
FIG. 5 cross-section view of the sealing assembly of an embodiment of the present invention utilizing square-rings.

Other embodiments are referred to in FIG. 5, where, sealing assembly 500 of the present invention is shown. Here, actuator pushrod 510 is shown having a dynamic sealing surface 520. The actuator pushrod 510 runs through center body 560, which separates the spring side 580 from the service side 590 of the spring brake actuator.

FIG. 5 also provides the sealing assembly 500 of the present invention whereby the sealing elements 540, 545 are shown. Here, retainer bearings 530 and 535 are shown having sealing elements 540 and 545 present between retainer bearings 530 and 535. Sealing element separator 550 is present between sealing elements 540 and 545. Sealing elements 540 and 545 are provided and shown as a square-ring.

Also shown in smooth bore sealing surface 570 of the center body 560. The bore or hole is filled by retainer bearings 530 and 535, sealing elements 540 and 545, and sealing element separator 550. These elements allow for the dynamic center seal of the spring brake actuator to be provided.

Figure 6:
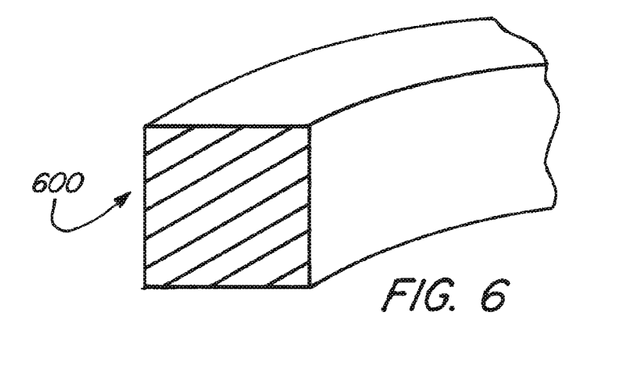
FIG. 6 is a perspective view of a square ring.

FIG. 6 show a perspective view of a quad ring 600 that is used as sealing elements 540 and 545.

Figure 7:
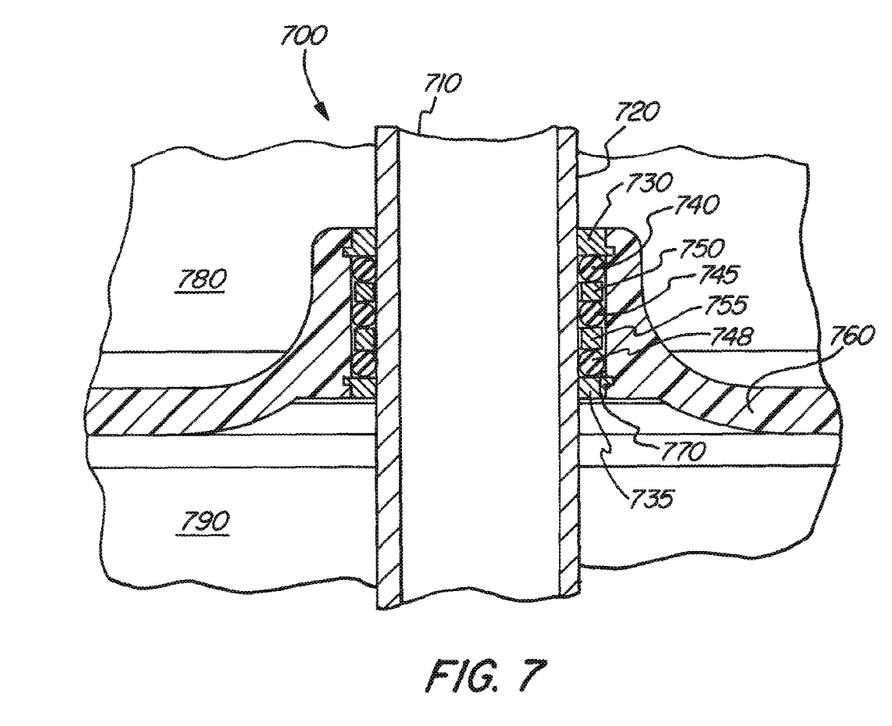
FIG. 7 is cross-section view of the sealing assembly of an embodiment of the present invention where more than one sealing element separator is provided.

Other embodiments are referred to in FIG. 7, where, sealing assembly 700 of the present invention is shown. Here, actuator pushrod 710 is shown having a dynamic sealing surface 720. The actuator pushrod 710 runs through center body 760, which separates the spring side 780 from the service side 790 of the spring brake actuator.

FIG. 7 also provides the sealing assembly 700 of the present invention whereby the sealing elements 740, 745 and 748 are shown. Here, retainer bearings 730 and 735 are shown having sealing elements 740, 745 and 748 present between retainer bearings 730 and 735. Sealing element separators 750 and 755 are present between sealing elements 740, 745 and 748, respectively. Sealing elements 740, 745 and 748 are provided and shown as an O-ring, however, square-rings, quad-rings and another other such sealing elements known in the art may be used.

Also shown in smooth bore sealing surface 770 of the center body 760. The bore or hole is filled by retainer bearings 730 and 735, sealing elements 740, 745 and 748, and sealing element separators 750 and 755. These elements allow for the dynamic center seal of the spring brake actuator to be provided.

Other embodiments may be provided where additional sealing element separators (3 or more) and sealing elements (4 or more) may be provided.

Figure 8:
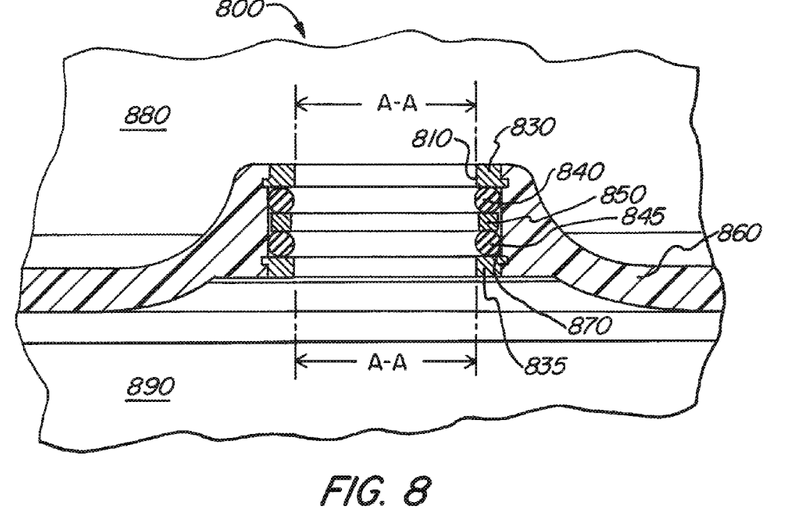
FIG. 8 is a cross-section view of the sealing assembly of an embodiment of the present invention where the hole is circular and has an equal diameter throughout.

FIG. 8 provides sealing assembly 800 of the present invention. Here, the actuator pushrod and dynamic sealing surface are not shown. FIG. 8 shows bore 810 having an equal diameter throughout as shown via element A-A. FIG. 8 shows center body 860, which separates the spring side 880 from the service side 890 of the spring brake actuator.

FIG. 8 also provides the sealing assembly 800 of the present invention whereby the sealing elements 840, 845 are shown. Here, retainer bearings 830 and 835 are shown having sealing elements 840 and 845 present between retainer bearings 830 and 835. Sealing element separator 850 is present between sealing elements 840 and 845. Sealing elements 840 and 845 are provided and shown as O-Ring(s), however square-rings, quad-rings and another other such sealing elements known in the art may be used.

Also shown in smooth bore sealing surface 870 of the center body 860. The bore or hole is filled by retainer bearings 830 and 835, sealing elements 840 and 845, and sealing element separator 850. These elements allow for the dynamic center seal of the spring brake actuator to be provided.

The invention also calls for methods and manufacturing and assembly of such a dynamic sealing assembly.

While the invention has been specifically described in connection with certain specific embodiments thereof, it is to be understood that this is by way of illustration and not of limitation and that various changes and modifications in form and details may be made thereto, and the scope of the appended claims should be construed as broadly as the prior art will permit.

The description of the invention is merely exemplary in nature, and thus, variations that do not depart from the gist of the invention are intended to be within the scope of the invention. Such variations are not to be regarded as a departure from the spirit and scope of the invention.

What is claimed is:

1. A spring brake actuator assembly for forming a seal in a spring brake actuator, the assembly comprising:
   a pushrod having a first surface, the first surface being smooth,
   a center body having a second surface,
   a cavity, the cavity located between the first surface and the second surface,
   two or more sealing elements located within the cavity,
   one or more sealing element separators that are free floating in the cavity between the sealing elements, and
   two retaining elements located within the cavity, the two retaining elements retaining the two or more sealing elements within the cavity, the two retaining elements each having edges that fit into respective holes in the center body to secure the two retaining elements tightly against the center body, the two retaining elements being in direct contact with the first surface of the pushrod and in direct contact with the second surface of the center body, such that the second surface of the center body does not have direct contact with the first surface of the pushrod,
   wherein the two or more sealing elements provide a dynamic seal, so as to directly seal the first surface of the pushrod to the second surface of the center body, where the two or more sealing elements are in direct contact with both the first surface of the pushrod and the second surface of the center body.

2. The assembly of claim 1, wherein prior to installation, the diameter of the two or more sealing elements is greater than the distance between the first and second sealing surfaces.

3. The assembly of claim 1, wherein the one or more sealing element separators separate the at least two sealing elements from one another.

4. The assembly of claim 3, wherein prior to installation, the combined width of the one or more sealing element separators, the two or more sealing elements and the two retaining elements is greater than the width of the cavity.

5. The assembly of claim 1, wherein the cavity is circular and has an equal diameter throughout.

6. The assembly of claim 1, wherein the two retaining elements are located along the ends of the cavity.

7. The assembly of claim 1, wherein the cavity is smooth.

8. The sealing assembly of claim 1, wherein the second surface is smooth.

9. The assembly of claim 1, wherein the two or more sealing elements are selected from a group consisting of a square-ring, O-ring, quad-ring, lip seal, or a combination thereof.

10. The assembly of claim 1, wherein the two retaining elements are bearings.

11. The assembly of claim 1, wherein the cavity is a through hole.

12. The assembly of claim 1, wherein the cavity is made by a machine selected from a group consisting of a drill, mill, or lathe.

13. A spring brake actuator for applying parking brakes of a vehicle, the spring brake actuator comprising:
   a housing including a first end wall, a second end wall opposing the first end wall, and a side wall extending between the first and second end walls, the first end wall, the second end wall and the side walls together defining a housing cavity therein;
   a diaphragm spanning the housing cavity, and dividing the housing cavity into a spring chamber located between the diaphragm and the first end wall, and a pressure chamber located between the diaphragm and the second end wall, the diaphragm being in a first position when the pressure chamber is pressurized with fluid and in a second position when the pressure chamber is exhausted;
   a spring brake actuator pushrod, wherein when the diaphragm is in the second position the pushrod is positioned to apply the parking brake, and when the diaphragm is in the first position the pushrod is positioned to release the parking brake; and
   an assembly for sealing the pushrod to a center body, the assembly comprising:
      a first surface located on the center body,
      a second surface located on the pushrod,
      a cavity, the cavity located between the first surface and the second surface,
      two or more sealing elements located within the cavity, one or more sealing element separators that are free floating in the cavity between the sealing elements, two retaining elements located within the cavity, the two retaining elements retaining the two or more sealing elements within the cavity, the two retaining elements each having edges that fit into holes in the center body to secure the two retaining elements tightly against the center body, the two retaining elements being in direct contact with the first surface of the pushrod and in direct contact with the second surface of the center body, such that the second surface of the center body does not have direct contact with the first surface of the pushrod, wherein the two or more sealing elements provided a dynamic seal, so as to directly seal the first surface of the pushrod to the second surface of the center body, where the two or more sealing elements are in direct contact with both the first surface of the pushrod and the second surface of the center body, and wherein upon sealing the first surface to the second surface the pushrod is sealed to the center body.

14. The spring brake actuator of claim 13, wherein prior to installation, the diameter of the two or more sealing elements is greater than the distance between the first surface and the second surface.

15. The spring brake actuator of claim 13, wherein the one or more sealing element separators separate the at least two sealing elements from one another.

16. The spring brake actuator of claim 13, wherein prior to installation, the combined width of the one or more sealing element separators, the two or more sealing elements and the two retaining elements is greater than the width of the cavity.

17. The spring brake actuator of claim 13, wherein the cavity is circular and has an equal diameter throughout.

18. A spring brake actuator assembly for sealing a spring brake actuator, the assembly comprising:
 a spring brake actuator pushrod having a first surface,
 a center body having a second surface,
 a cavity, the cavity located between the first surface and the second surface,
 two sealing elements located within the cavity,
 one sealing element separator that is free floating within the cavity and between the two sealing elements, and
 two retaining elements located within the cavity, the two retaining elements retaining the two sealing elements within the cavity, the two retaining elements each having edges that fit into holes in the center body to secure the two retaining elements tightly against the center body, and
 wherein the two sealing elements provide a dynamic seal, so as to seal the first surface to the second surface, wherein the two sealing elements are in direct contact with both the first surface of the pushrod and the second surface of the center body.

19. The assembly of claim 18, wherein prior to installation, the combined width of the two sealing elements and sealing element separator is greater than the distance between the two retaining elements.

20. The assembly of claim 18, wherein prior to installation, the diameter of each of the two sealing elements is greater than the distance between the first surface and the second surface.

21. The assembly of claim 18, wherein the cavity is circular and has an equal diameter throughout.

22. The assembly of claim 18, wherein the cavity is made by a machine selected from a group consisting of a drill, mill, or lathe.

* * * * *